United States Patent [19]
Katori

[11] Patent Number: 4,788,891
[45] Date of Patent: Dec. 6, 1988

[54] PLANETARY GEAR HAVING NON-CIRCULAR GEARS

[75] Inventor: Hideo Katori, Hidaka, Japan

[73] Assignees: Japan Society for the Promotion of Machine Industry, Tokyo; Hikari Kosakusho Co., Ltd., Kawanishi, both of Japan

[21] Appl. No.: 938,381

[22] Filed: Dec. 5, 1986

[51] Int. Cl.⁴ .......................... F16H 3/54; F16H 3/56
[52] U.S. Cl. .................................. 74/781 R; 74/793; 74/802; 74/803
[58] Field of Search .................. 74/802, 803, 805, 793, 74/751 R, 421 R; 7/781 R

[56] References Cited

U.S. PATENT DOCUMENTS

| | | | |
|---|---|---|---|
| 2,231,784 | 2/1941 | Von Thungen | 74/802 |
| 2,329,604 | 9/1943 | Ginter | 74/803 X |
| 2,722,851 | 11/1955 | Steiner | 74/802 |
| 2,830,473 | 4/1958 | Brown | 74/802 |
| 3,143,899 | 8/1964 | York | 74/802 X |
| 3,301,171 | 7/1967 | Nasvytis | 74/802 X |
| 3,705,522 | 12/1972 | Ogawa | 74/803 |
| 4,317,389 | 3/1982 | Falzoni | 74/689 |
| 4,329,888 | 5/1982 | Falzoni | 74/689 |

FOREIGN PATENT DOCUMENTS

| | | | |
|---|---|---|---|
| 32749 | 1/1924 | Denmark | 74/803 |
| 158572 | 1/1983 | Fed. Rep. of Germany | 74/802 |
| 184742 | 11/1982 | Japan | 74/802 |
| 364954 | 11/1962 | Switzerland | 74/803 |
| 1000539 | 8/1965 | United Kingdom | 74/802 |

Primary Examiner—Lawrence J. Staab
Assistant Examiner—Dwight G. Diehl
Attorney, Agent, or Firm—W. G. Fasse; D. H. Kane, Jr.

[57] ABSTRACT

A planetary gear device using non-circular gears comprising a casing, an input shaft rotatably supported in the casing and driven for rotation by a drive source, a carrier fixed on the input shaft, an output shaft rotatably supported in the casing, a rotary body concentric with the input shaft and rotatably supported in the casing, and a planetary gear unit rotatably supported on the planetary shaft. The planetary gear unit integrally comprises a main driving gear and a driven gear. The planetary shaft is connected at one end thereof to the carrier and at the other end to the rotary body. Fixed on the output shaft is an output gear meshing with the driven gear. Fixed to the casing is a fixed gear meshing with the main driving gear. At least either the combination of the main driving gear and fixed gear or the combination of the driven gear and output gear forms a pair of non-circular gears.

9 Claims, 11 Drawing Sheets

PLANETARY GEAR HAVING NON-CIRCULAR GEARS

BACKGROUND OF THE INVENTION

1. Field of the Invention

This invention relates to a gear device composed of a plurality of gears, and particularly to a planetary gear device using non-circular gears.

2. Description of the Prior Art

In factory and office equipment, it often becomes necessary to reduce the rotational velocity of the output shaft of a general purpose 4-pole motor by velocity reduction means and to convert this reduced constant velocity rotation to swing motion, swing rotation, intermittent rotation or some other unconstant velocity rotation. In such a case, it has been the usual practice to interpose unconstant velocity means such as a cam mechanism or a Geneva mechanism. According to such a method, however, it is necessary to provide both velocity reduction means and unconstant velocity means, adding not only to the space for installing the entire device but also to the cost of the device. The use of such a conventional cam mechanism or a Geneva mechanism entails problems such as a limited range of unconstant velocity rotation a high slip factor and low mechanical efficiency.

On the other hand, a planetary gear device has been widely used as a compact device which provides a high reduction gear ratio. Heretofore, circular gears having circular pitch curves have been exclusively used as gears for constituting such a planetary differential gear device. It has also been contemplated to use non-circular gears for constituting a planetary differential gear device, but the use of non-circular gears in that case has been limited to those gears whose teeth can be practically machined, such as elliptical gears. Therefore, even if a planetary gear device fabricated is incorporating elliptical gears, changes in the angular velocity ratio of the angular velocity output relative to the angular velocity input are obtained only in a limited range.

However, recently, with the progress of computers, it has become practicable to design and machine non-circular gears other than elliptical gears (refer to pages 109 et seq. of Precision Machine Society's 1984 Kansai District Regular Scientific Lecture Meeting Theses, and pages 38 et seq. of Second Design Automation Engineering Lecture Theses). Simple use of a set of such non-circular gears, however, fails to produce such motions as intermittent rotation, swing motion, and swing rotation. Thus, it has have been to made in incorporate various non-circular gears in said planetary gear devices for obtaining a unconstant velocity rotational motion useful for automation and to integrate velocity reduction means and unconstant velocity means together (refer to pages 393 et seq., No. 1, Vol. 39, Part 3 of Japan Society of Mechanical Engineers' Theses).

A conventional planetary gear device used in such attempts is schematically shown in FIG. 1. The illustrated planetary gear device comprises an input shaft a rotatably supported in a casing k, a carrier b fixed to the input shaft a, a planetary shaft c eccentrically positioned relative to the input shaft and connected at one end thereof to the carrier b in a cantilever manner, a planetary gear unit d integrally having a main driving gear e and a driven gear f and rotatably supported on the planetary shaft c, an output shaft j rotatably supported in the casing k, an output gear h fixed on the output shaft j and meshing with the driven gear f, and a fixed gear g fixed to the casing k and meshing with the main driving gear e. A pair of non-circular gears are used for each of the combinations of the main driving and fixed gears e and g and the driven and output gears f and h.

The planetary gear device shown in FIG. 1 can be accepted as having integrated velocity reduction means and unconstant velocity means together. On the other hand, since the output shaft j rotates at unconstant velocity while the input shaft a rotates at constant velocity, acceleration acts on the various components on the output side. As a result, the force to be transmitted, i.e. the load, acting between the components on the input side and the components on the output side pulsates. To withstand such a pulsating load, it is necessary, in the planetary gear device shown in FIG. 1, to increase the strength of the various components as compared with a conventional planetary gear device using circular gears. In particular, since the planetary gear unit d integrally has the main driving and driven gears e and f, the axial length increases to a great extent. Since the planetary shaft c supports such planetary gear unit d in a cantilever manner, a bending moment due to the high dynamic load acts on the planetary gear unit c. To withstand such a high bending moment, it is necessary, in the planetary differential gear device shown in FIG. 1, to increase the size of the planetary shaft c, carrier b and input shaft a. Thus, the planetary gear device shown in FIG. 1 inevitably has the drawback that the entire gear device is large-sized and heavy; these drawbacks must be eliminated before the planetary gear device can be put to practical use.

SUMMARY OF THE INVENTION

An object of the invention is to solve the problem in a planetary gear device using non-circular gears, that a heavy variable load acts on the planetary shaft to cause the necessary engineering design which results in large size and heavy weight.

The invention will now be outlined with reference to FIG. 2.

An illustrated planetary gear device 1 comprises an input shaft 2, a casing 3, a planetary shaft 5, a planetary gear unit 6, a fixed gear 9, an output gear 10, an output shaft 11 and a rotary body 12. The input shaft 2 is rotatably supported in the casing 3 and is driven for rotation by an unillustrated drive source. A carrier 4 is fixed on the input shaft 2 and extends radially from the input shaft 2. The output shaft 11 is rotatably supported in the casing 3. The rotary body 12 is concentric with the input shaft 2 and rotatably supported in the casing 3. The planetary shaft 5 is eccentrically positioned with respect to the input shaft 2 and is connected at one end 5a to the carrier 4 and at the other end 5b to the rotary body 12. The planetary gear unit 6 integrally comprises a main driving gear 7 and a driven gear 8 and is rotatably supported on the planetary shaft 5. The output gear 10 is fixed on the output shaft 11. Further, the fixed gear 9 is fixed to the casing 3 and meshes with the main driving gear 7.

At least either the combination of the main driving gear 7 and fixed gear 9 or the combination of the driven gear 8 and output gear 10 forms a pair of non-circular gears.

The operation of the planetary gear device 1 will now be described.

The input shaft 2 connected to the output shaft of such power means as a motor rotates at constant velocity in the direction of arrow 2' shown in the figure. With this rotation, the planetary shaft 5 made integral with the input shaft 2 through the carrier 4 performs constant velocity rotation at the same velocity around the axis of the input shaft 2 and in response thereto the planetary gear unit 6 performs a constant velocity rotation around the axis of the input shaft 2. The rotation of the planetary gear unit 6 around the axis of the input shaft 2 causes the main driving gear 7 meshing with the fixed gear 9 to perform rotation around its own axis in the direction of arrow 7' shown in the figure. In this case, if the main driving and fixed gears 7 and 9 form a pair of non-circular gears, the rotation of the main driving gear 7 around its own axis is at an unconstant velocity. The driven gear 8 integral with the main driving gear 7 also rotates at unconstant velocity. In this case, if the driven and output gears 8 and 10 form a pair of circular gears, the output gear 10 rotates at an unconstant velocity owing to the unconstant velocity rotation of the driven gear 8 like the rotation described above. In other words, the output shaft 11 also performs an unconstant velocity rotation in the direction of arrow 11' shown in the figure. In this manner, the constant velocity rotation of the input shaft 2 is reduced in velocity and converted to an unconstant velocity rotation when transmitted to the output shaft 11.

In the above description, the main driving gear 7 and fixed gear 9 have been described as forming a pair of non-circular gears and the driven gear 8 and output gear 10 forming a pair of circular gears. However, the same function can be performed even if these combinations are reversed or each combination forms a pair of non-circular gears.

According to the invention, the planetary shaft 5 which is subjected to a variable load is supported at both ends. Therefore, the stress acting on the planetary shaft 5 is reduced and hence the planetary shaft 5 can be reduced in size. Further, since the carrier 4 and input shaft 2 can be be reduced in size, the entire device can be made small-sized, lightweight, and compact form. Along with this feature, the device is made inexpensive and can be put to practical use. Further, supporting the planetary shaft 5 at both ends minimizes strains in the various components and improves efficiency of transmission and accuracy of rotation.

Since non-circular gears are incorporated in a planetary gear device, there is obtained a variation in the rotation of the output shaft which could not be obtained with a set of non-circular gears alone. Such a variation in the rotation of the output shaft may be used for automation of various devices. Further, by suitably configuring non-circular gears, it is possible to increase the number of divisions in each revolution of the output shaft for indexing operations or to improve the acceleration characteristics of the output shaft.

Further, since the planetary gear device itself effects velocity reduction, there is no need to provide a separate velocity reduction means; the device itself has a self-locking function. Since the input and output shafts can be supported in a line, the device is convenient to use. Since the planetary gear device of this invention uses only gears as rotation transmission means, the slip factor is low. Therefore, there is no possibility of the transmission efficiency decreasing as when cam means or Geneva means are used, and the accuracy of rotation is improved.

These and other objects, features, aspects and advantages of the present invention will become more apparent from the following detailed description of the present invention when taken in conjunction with the accompanying drawings.

DESCRIPTION OF THE PREFERRED EMBODIMENTS

A first embodiment of the invention will now be described with reference to FIGS. 3 through 9.

Figure 1:
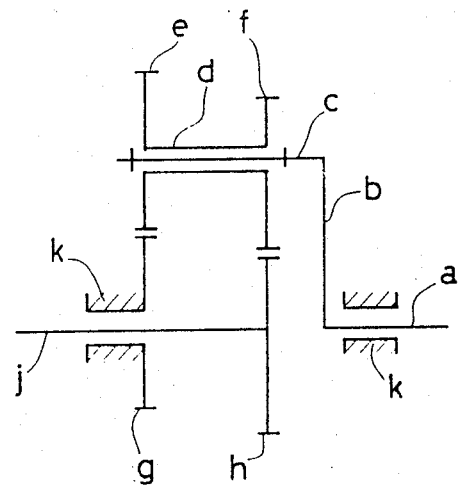
FIG. 1 is a schematic view showing a conventional planetary gear device.
Figure 2:
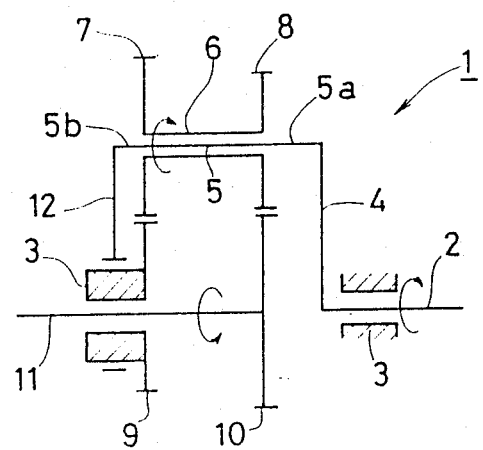
FIG. 2 is a schematic view showing a planetary gear device according to this invention.
Figure 3:
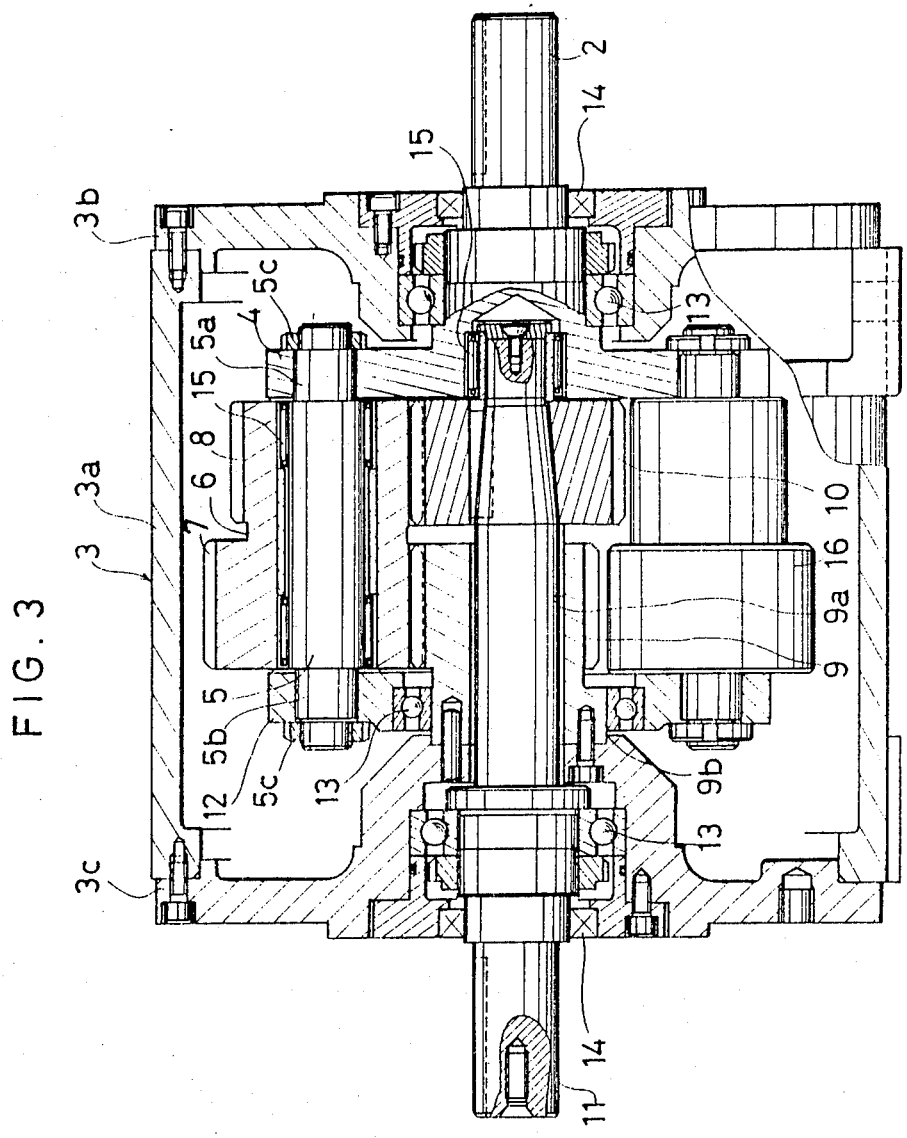
FIG. 3 is a longitudinal sectional view showing a first embodiment of the invention.

Referring to FIG. 3, a casing 3 forming a main component of a planetary gear device has a cylindrical yoke 3a and front and back covers 3b and 3c that are fixedly yet removably mounted to the front and back of said yoke 3a to prevent leakage of oil. An input shaft 2 driven for rotation by a drive source extends through the front cover 3b is rotatably supported by said front cover 3b through a ball bearing 13. As illustrated, there is an oil seal 14 installed between the input shaft 2 and the front cover 3b to prevent oil from leaking through the penetrated region. The input shaft 2 has a disk-like carrier 4 ridgidly attached thereto which extends radially from said input shaft 2.

On the other side, an output shaft 11 coaxial with the input shaft 2 is rotatably supported in the back cover 3c of the casing 3 through a ball bearing 13. The front end portion of the output shaft 11 is rotatably supported in the middle portion of the carrier 4 through a roller bearing 15. As illustrated, there is an oil seal 14 installed between the output shaft 11 and the back cover 3c to prevent oil from leaking through the penetrated region.

A fixed gear 9 is fixedly installed within the casing 3 such that it is coaxial with the output shaft 11. The fixed gear 9 is centrally formed with a bore 9a through which the output shaft 11 extends. As illustrated, part of the outer periphery of the fixed gear 9 is formed with a cylindrical portion 9b. A disk-like rotary body 12 is rotatably supported on the cylindrical portion 9b through a ball bearing 13.

Within the casing 3, a single planetary shaft 5 is disposed eccentric relative to the input shaft 2. The planetary shaft 5 is connected at one end 5a thereof to the carrier 4 by a nut 5c and at the other end 5b to the rotary body 12 by a nut 5c. In this manner, the planetary shaft 5 is supported at both ends. A planetary gear unit 6 is rotatably supported on the planetary shaft 5 through roller bearings 15. The planetary gear unit 6 integrally comprises a main driving gear 7 and a driven gear 8.

On the other hand, the output shaft 11 has an output gear 10 fixedly installed thereon. The output gear 10 is adapted to mesh with the driven gear 8 of the planetary gear unit 6. The fixed gear 9 fixed to the casing 3 is adapted to mesh with the main driving gear 7 of the planetary gear unit 6. In this embodiment, the main driving gear 7 and fixed gear 9 form a pair of non-circular gears while the driven gear 8 and output gear 10 form a pair of circular gears.

As can be seen in FIG. 3, the entire power transmission mechanism of the planetary gear device is constructed as a single unit that can easily be slide out of the cylindrical yoke 3a upon removal of either the front or back covers 3b or 3c.

As illustrated, between the carrier 4 and the rotary body 12, there is a mass balance 16 installed in symmetrical relationship to the planetary shaft 5 with respect to the axis of the input shaft 2.

Figure 4:
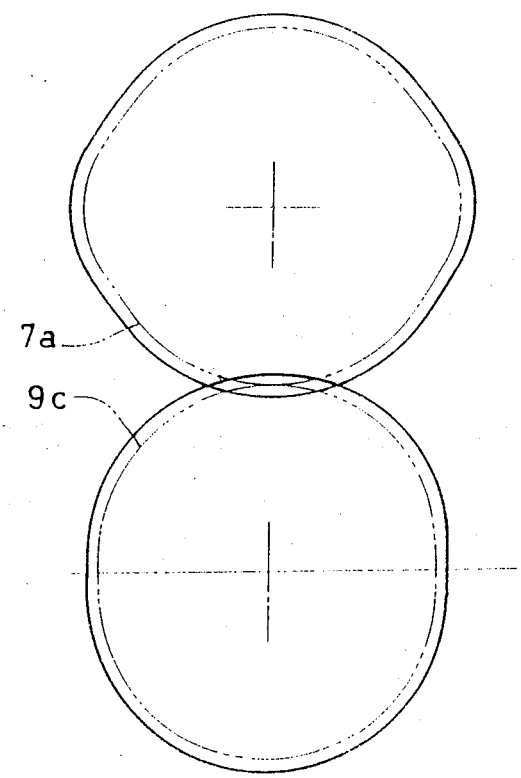
FIG. 4 is a view showing the pitch curves of a pair of non-circular gears.
Figure 5:
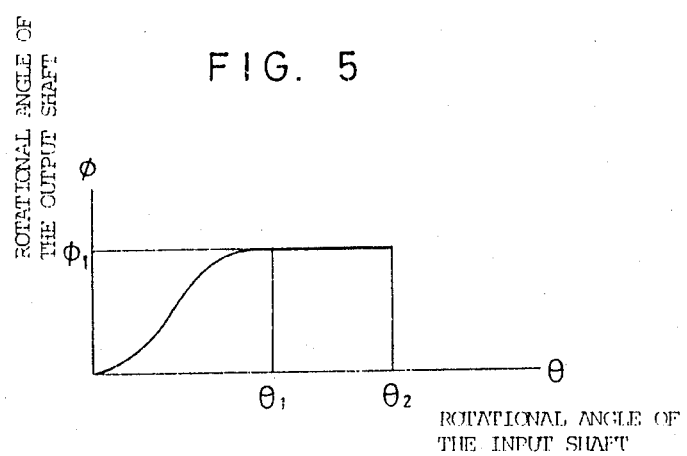
FIG. 5 is a view for explaining the function of the pair of non-circular gears shown in FIG. 4.

FIG. 4 shows the pitch curves 7a and 9c of the main driving gear 7 and fixed gear 9, respectively, which form a pair of non-circular gears. In the case where the main driving gear 7 and fixed gear 9 having the pitch curves as illustrated are used, the relationship between the rotational angle $\theta$ of the input shaft 2 and the rotational angle $\phi$ of the output shaft 11 is as shown in FIG. 5. In the figure, the horizontal axis indicates the rotational angle $\theta$ of the input shaft 2 and the vertical axis indicates the rotational angle $\phi$ of the output shaft 11 corresponding to the rotational angle $\theta$ of the input shaft 2. When the rotational angle $\theta$ of the input shaft 2 changes to $\theta 1$, the rotational angle $\phi$ changes to $\phi 1$. Thereafter, until the rotational angle $\theta$ of the input shaft 2 changes to $\theta 2$, the rotational angle $\phi$ is held at $\phi 1$. In this manner, one cycle of change in the rotational angle $\phi$ of the output shaft 11 is completed. In this case, the output shaft 11 performs intermittent rotation. Such intermittent rotation of the output shaft 11 can be utilized for the indexing operation of automatic machines.

Figure 6:
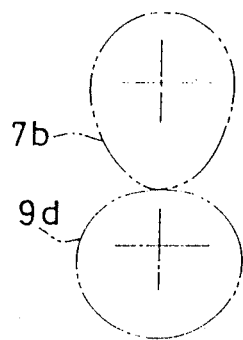
FIG. 6 is a view showing the pitch curves of a pair of non-circular gears.
Figure 7:
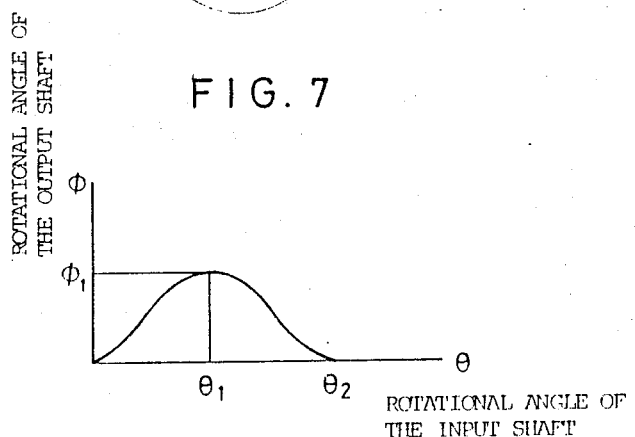
FIG. 7 is a view for explaining the function of the pair of non-circular gears shown in FIG. 6.

Reference will now be made to the case wherein the main driving gear 7 and fixed gear 9 which form a pair of non-circular gears have pitch curves 7b and 9d as shown in FIG. 6. In this case, the relationship between the rotation angle $\theta$ of the input shaft 2 and the rotational angle $\phi$ of the output shaft 11 is as shown in FIG. 7. That is, the rotational angle $\phi$ of the output shaft 11 will be at a maximum $\phi 1$ when the rotational angle $\theta$ of the input shaft 2 changes to $\theta 1$. When the rotational angle $\theta$ of the input shaft 2 changes to $\theta 2$, the rotational angle $\phi$ of the output shaft 11 returns to the original position. That is, in this case, the output shaft repeats a swing motion.

Figure 8:
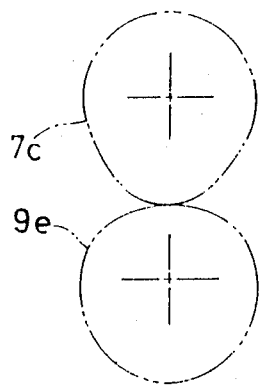
FIG. 8 is a view showing the pitch curves of a pair of non-circular gears.
Figure 9:
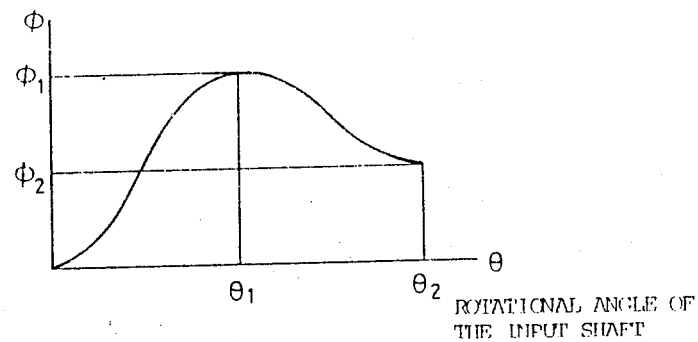
FIG. 9 is a view for explaining the function of the pair of non-circular gears shown in FIG. 8.

In the case where the main driving gear 7 and fixed gear 9 have pitch curves 7c and 9e as shown in FIG. 8, the relationship between the rotational angle $\theta$ of the input shaft 2 and the rotational angle $\phi$ of the output shaft 11 is as shown in FIG. 9. When the rotational angle $\theta$ of the input shaft 2 changes to $\theta 1$, the rotational angle $\phi$ of the output shaft 11 changes to $\phi 1$ which is a local maximum. When the rotational angle $\theta$ of the input shaft 2 changes to $\theta 2$, the rotational angle $\phi$ of the output shaft 11 returns to $\phi 2$. That is, in this case, the output shaft 11 performs a swing rotational motion.

In the embodiment described above, the main driving gear 7 and fixed gear 9 are a pair of non-circular gears and the driven gear 8 and output gear 10 are a pair of circular gears. However, these combinations may be reversed such that the combination of the main driving gear 7 and fixed gear 9 is in the form of a pair of circular gears and the combination of the driven gear 8 and output gear 10 is in the form of a pair of non-circular gears. Each of these combination may be a pair of non-circular gears.

Figure 10:
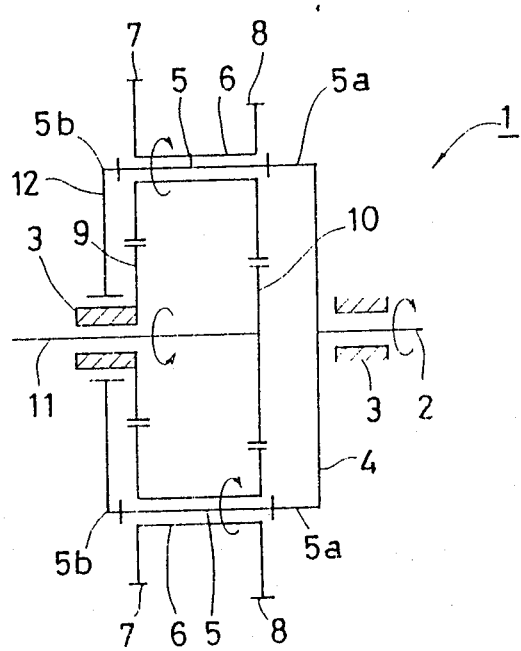
FIG. 10 is a schematic view showing a second embodiment of the invention.

A second embodiment of the invention will now be outlined with reference to FIG. 10. In this figure, parts which are the same as or correspond to those described in the first embodiment are indicated by the same or corresponding characters.

A planetary gear device 1 shown in FIG. 10 comprises an input shaft 2, a casing 3, a carrier 4, a plurality of planetary shafts 5, planetary gear units 6, a fixed gear 9, an output gear 10, an output shaft 11, and a rotary body 12. The point in which the second embodiment differs from the first one described above is that there are a plurality of planetary shafts 5 which are equispaced from each other on a circle with the center at the axis of the input shaft 2. Each planetary shaft 5 rotatably supports the associated planetary gear unit 6.

At least either the combination of each main driving gear 7 and fixed gear 9 or the combination of each driven gear 8 and output gear 10 must form a pair of non-circular gears whose pitch curves are symmetrical with respect to each other. The number of planetary shafts 5, is the same as the number of symmetries, are symmetrically arranged with respect to the input shaft 2. For example, in the case of the pitch curves shown in FIG. 4, the number of symmetries is 2.

The function of the second embodiment shown in FIG. 10 will now be described. The input shaft 2 connected to the output shaft of such power means as a motor rotates at constant velocity in the direction of arrow 2' shown in the figure. With this rotation, the plurality of planetary shafts 5 integral with the input shaft 2 perform constant velocity rotation at the same velocity around the axis of the input shaft 2. In response thereto, each planetary gear unit 6 rotates around the axis of the input shaft 2. At the same time as this rotation, each main driving gear rotates around its own axis because of its meshing with the fixed gear 9. If each main driving gear 7 and fixed gear 9 form a pair of non-circular gears as shown in FIG. 4, the rotation of the main driving gear 7 around its own axis is at an unconstant velocity. The rotation of the driven gear 8 is also at an unconstant velocity since it is integral with the main driving gear 7.

On the other hand, if each driven gear 8 and output gear 10 form a pair of circular gears, the unconstant velocity rotation of each driven gear 8 is transmitted to the output shaft 11 through the output gear 10. In this manner, the constant velocity rotation of the input shaft 2 is reduced in velocity and converted to an unconstant velocity rotation when it is transmitted to the output shaft 11.

In addition, in this case, the relationship between the rotational angle $\theta$ of the input shaft 2 and the rotational angle $\phi$ of the output shaft 11 is such that, as shown in FIG. 5, when the rotational angle $\theta$ of the input shaft 2 has changed to $\theta 2$, one cycle of change in the rotational angle $\phi$ of the output shaft 11 is completed. Let "i"=$2\pi/\theta 2$. When i≧2 and i is a natural number, the change in the rotational angle $\phi$ of the output shaft 11 makes "i" cycles during the time the rotational angle $\theta$ of the input shaft 2 changes from 0 to $2\pi$. In this case, "i" equals the number of planetary gear units that can be symmetrically installed.

In the second embodiment, since there are a plurality of planetary shafts 5 and a plurality of planetary gear units 6, which are subjected to variable loads and which are symmetrically installed, each of these variable loads is divided into parts, a fact which means that the planetary shafts 5 and a planetary gear units 6 can be reduced in size. Further, a balanced state can be established around the input shaft 2. Besides this, since the planetary shafts 5 receive equal reactions from their associated planetary gear units 6, the input shaft, output shaft and fixed gear, though subjected to a twisting moment, are never subjected to a bending moment, so that these components along with bearings can also be reduced in size. Further, there is no strain occurring in the various components and the efficiency of transmission and the accuracy of rotation are improved. Thus, a planetary differential gear device of practical use can be provided.

Figure 11:
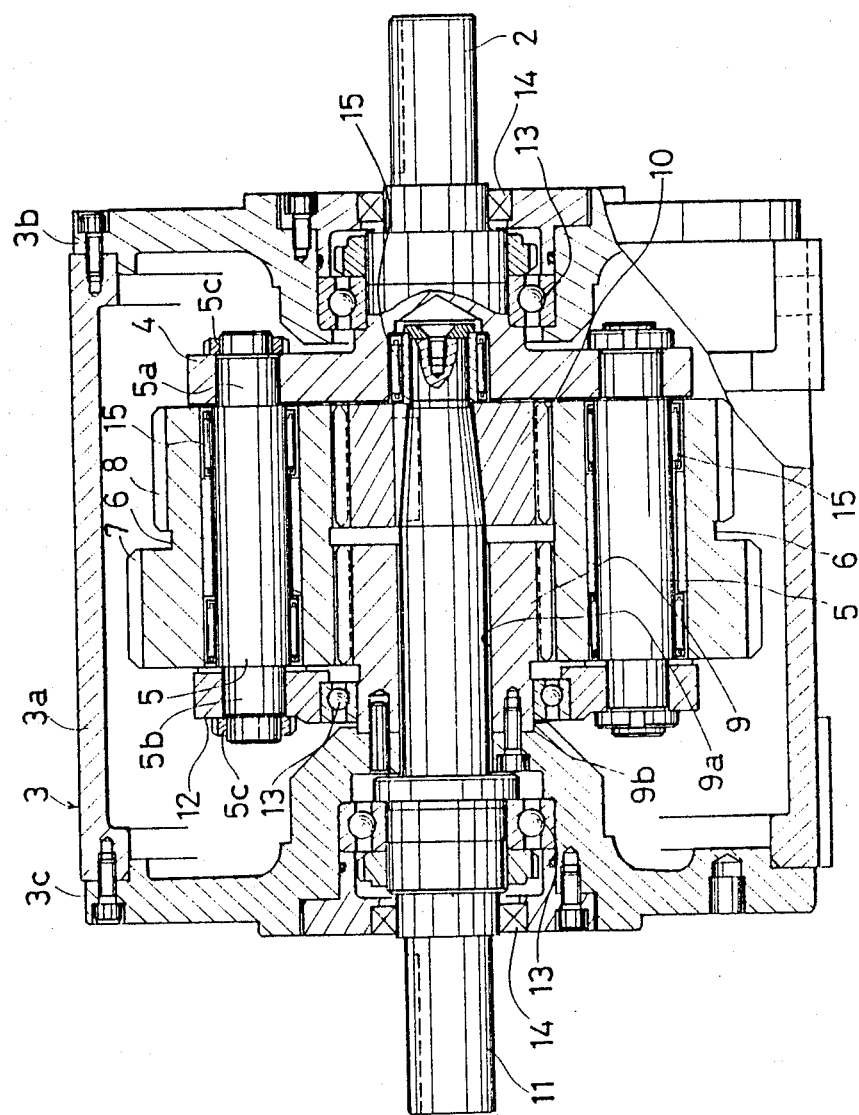
FIG. 11 is a longitudinal sectional view of the second embodiment.

FIG. 11 is a longitudinal sectional view of a planetary gear device according to the second embodiment of the invention shown in FIG. 10. In this embodiment, there are planetary shafts 5 installed in two locations in symmetry with respect to the input shaft 2, and planetary gear units 6 of the same construction as in the first embodiment are rotatably supported respectively on the planetary shafts 5.

The main driving gear 7 and fixed gear 9 in this embodiment form a pair of non-circular gears. An example of rotation-symmetrical pitch curves for such non-circular gears is shown in FIG. 4. In the case where the main driving gear 7 and fixed gear 9 having pitch curves as shown in FIG. 4 are used, the relationship between the rotational angle $\theta$ of the input shaft 2 and the rotational angle $\phi$ of the output shaft 11 is as shown in FIG. 5. That is, in this case, the output shaft 11 performs intermittent rotation. Such intermittent rotation may be utilized for the indexing operation of automatic machines.

Figure 12:
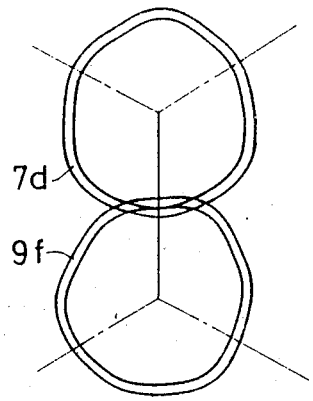
FIG. 12 is a view showing the pitch curves of a pair of non-circular gears to be used in the second embodiment shown in FIG. 11.

As shown in FIG. 12, if each of the pitch curves 7d and 9f of the main driving gear 7 and fixed gear 9 is shaped such that it is rotation-symmetrical at three locations with respect to the center (in the case where $\theta 2$ is $2\pi/3$), three planetary gear units 6 may be equispaced from each other on a circle with the center at the axis of the input shaft 2. In brief, when "i"=$2\pi/\theta 2$ and where "i"≧2 and "i" is a natural number, this embodiment is possible and a number "i" of planetary gear units 6 can be installed. The advantages of the provision of a plurality of gear units 6 are that the rotational balance in the rotary parts is improved and that the load on each gear is distributed and hence the gears and input shaft 2 can be reduced in size.

Figure 13:
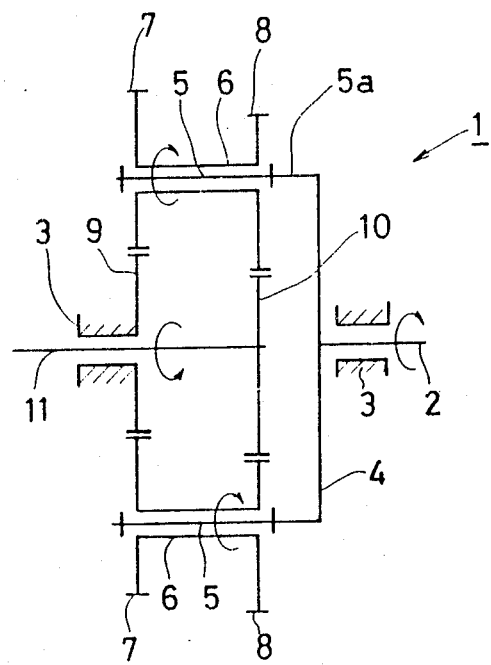
FIG. 13 is a schematic view showing a third embodiment of the invention.

FIG. 13 is a schematic view showing a third embodiment of the invention. The point in which the third embodiment shown in FIG. 13 differs from the second one shown in FIG. 10 is that a rotary body 12 for supporting the other ends of a plurality of planetary shaft 5 is not provided. Also in this embodiment, the rotational balance of the rotary parts is improved and the load on each gear is distributed.

Figure 14:
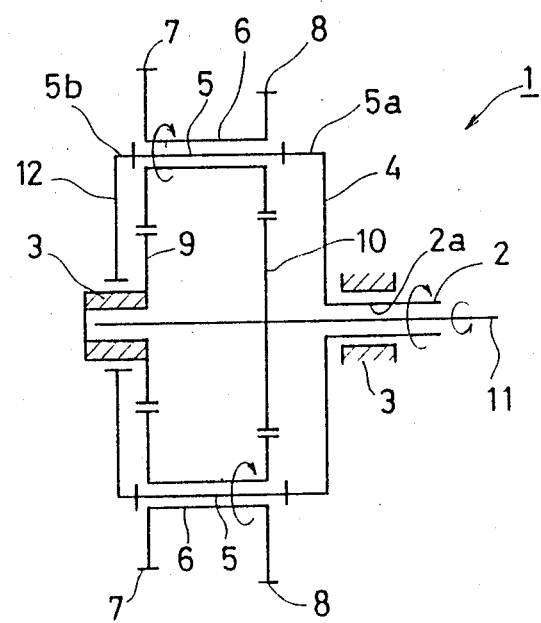
FIG. 14 is a schematic view showing a fourth embodiment of the invention.

FIG. 14 is a schematic view showing a fourth embodiment of the invention.

An illustrated planetary gear device 1 comprises a casing 3, an input shaft 2 rotatably supported in the casing, a carrier 4 fixedly mounted on the input shaft 2, an output shaft 11 rotatably supported in the casing 3, a rotary body 12 rotatably supported in the casing 3, a plurality of planetary shafts 5 connected at one of the respective ends thereof to the carrier 4 and at the other ends to the rotary body 12 and equispaced from each other on a circle with the center at the axis of the input shaft 2, planetary gear units 6 each integrally having comprises a main driving gear 7 and a driven gear 8 and rotatably supported on the associated planetary shaft 5, an output gear 10 fixed on the output shaft 11 and meshing with the driven gear 8, and a fixed gear 9 fixed to the casing 3 and meshing with the main driving gear 7. At least either the combination of the main driving gear 7 and fixed gear 9 or the combination of the driven gear 8 and output gear 10 must form a pair of non-circular gears. As illustrated, the input and output shafts 2 and 11 project beyond the same lateral surface of the casing 3. Further, in this embodiment, the input shaft 2 is in the form of a sleeve having a hole 2a through which the output shaft 11 extends.

The function of the fourth embodiment shown in FIG. 14 will now be described. The input shaft 2 driven for rotation by a power source rotates at constant velocity in the direction of arrow 2' shown in the figure. With this, the plurality of planetary shafts 5 integral with the input shaft 2 rotate at the same velocity around the axis of the input shaft 2 and in response thereto the plurality of planetary gear units 6 also rotate around the axis of the input shaft 2. With this rotation of the planetary gear units 6, the main driving gears 7 rotate around their respective axes because of their meshing with the fixed gear 9. If each main driving gear 7 and fixed gear 9 form a pair of non-circular gears, the rotation of the main driving gear around its own axis is at an unconstant velocity and so is the rotation of the driven gear 8 around its own axis. On the other hand, if each driven gear 8 and output shaft 10 form a pair of circular gears, the unconstant velocity rotation of the driven gears 8 is transmitted to the output shaft 11 through the output gear 10. In this manner, the constant velocity rotation of the input shaft 2 is reduced in velocity and is converted to an unconstant velocity rotation when it is transmitted to the output shaft 11.

In the above example, each main driving gear 7 and fixed gear 9 have been described as forming a pair of non-circular gears and each driven gear 8 and output gear 10 as forming a pair of circular gears, but even if these combinations are reversed or both comprise non-circular gears, the same function can be attained. In the embodiment illustrated in FIG. 14, the input shaft 2 is in the form of a sleeve through which the output shaft 11 extends. However, this arrangement may be reversed; that is, the output shaft 11 may be in the form of a sleeve through which the input shaft 2 extends.

In the fourth embodiment shown in FIG. 14, the input shaft 2 and the output shaft 11 project beyond the same lateral surface of the casing 3, and either the input shaft 2 or the output shaft 11 is in the form of a sleeve and the other extends through said sleeve. Thus, the following advantage is obtained: Since the output shaft 11 which is rotating at a low velocity and is subjected to a heavy variable load is arranged to project to the same side as does the input shaft 2, the distance between the position where the output gear is attached to the output shaft 11 and the outer end is reduced and so are the bending moments acting on the output shaft 11 and the twist angle. Therefore, the planetary gear device shown in FIG. 14 is advantageous from the standpoint of strength and can be designed in a compact form. Further, this embodiment is applicable where it is required that the input and output shafts 2 and 11 be present on the same lateral side of the casing 3.

Figure 15:
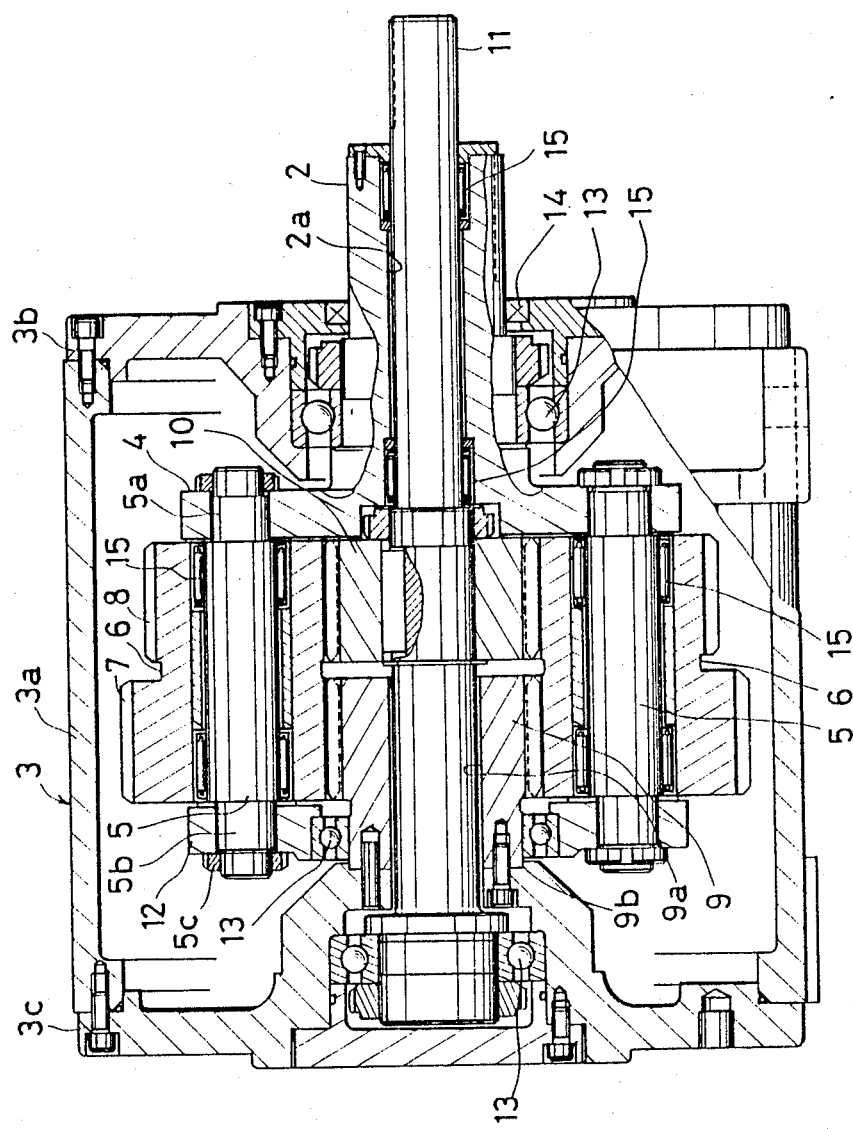
FIG. 15 is a longitudinal sectional view of the fourth embodiment.

FIG. 15 is a longitudinal sectional view of a planetary gear device according to the fourth embodiment shown in FIG. 14. In this embodiment, the input shaft 2 is in the form of a sleeve having a central hole 2a. The output shaft 11 extends through the hole 2a of the input shaft 2 and is supported by roller bearings 15 for rotation within the hole 2a. The front end portion of the output shaft 11 is rotatably supported by a ball bearing 13 in the casing 3. As illustrated, the input and output shafts 2 and 11 project beyond the same lateral side of the casing 3.

In the embodiment shown in FIG. 15, because of the construction for supporting the output shaft 11, it is possible to reduce the portion of the length of the output shaft subjected to torque when the load on the output side is transmitted from the driven gear 8 to the output gear 10 and then to the output shaft 11. This is advantageous from the standpoint of strength. Further, this arrangement is convenient where it is required that the input and output shafts be present on the same side.

Figure 16:
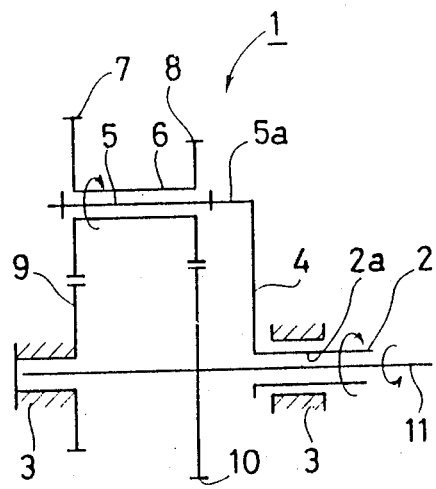
FIG. 16 is a schematic view showing a fifth embodiment of the invention.

FIG. 16 is a schematic view showing a fifth embodiment of the invention. In this embodiment, as in the fourth embodiment, the input shaft 2 is in the form of a sleeve through which the output shaft 11 extends. The only point in which this embodiment differs from the fourth embodiment is that a single planetary shaft 5 is used and is supported in a cantilever manner.

Figure 17:
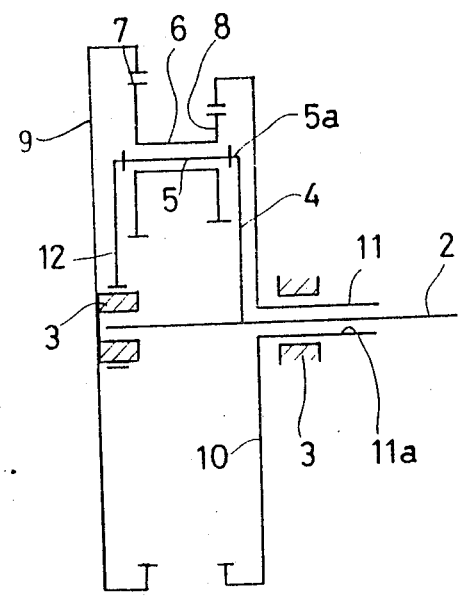
FIG. 17 is a schematic view of a sixth embodiment of the invention.

FIG. 17 is a schematic view of a sixth embodiment of the invention. In this embodiment, the output shaft 11 is in the form of a sleeve through which the input shaft 2 extends. In the embodiments described so far, the output gear 10 fixed on the output shaft 11 and the fixed gear 9 have been in the form of external gears. In this embodiment, however, the output gear 10 and the fixed gear 9 have in the form of internal gears. There is only one planetary shaft 5 and only one planetary gear unit 6. The planetary shaft 5 is connected at one end thereof to a carrier 4 and at the other end thereof to a rotary body 12 which is rotatably supported by the casing 3.

Figure 18:
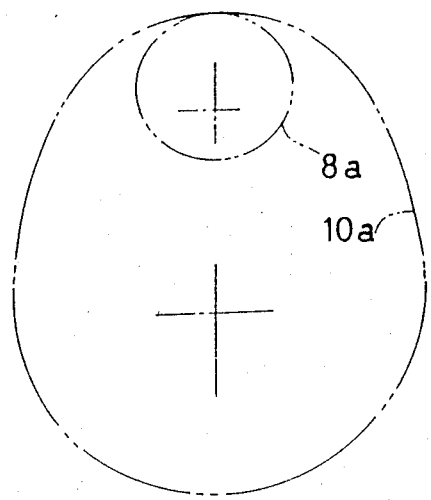
FIG. 18 is a view showing the pitch curves of a pair of non-circular gears to be used in the embodiment shown in FIG. 17.

In the sixth embodiment shown in FIG. 17, the main driving gear 7 and fixed gear 9 form a pair of circular gears while the driven gear 8 and output gear 10 form a pair of non-circular gears. If the pitch curves of the non-circular gears in this embodiment are configured as shown at 8a and 10a in FIG. 18, the rotational angle φ of the output shaft 11 is similar to that associated with the swing motion shown in FIG. 7. When there is only one planetary gear unit 6 as in this embodiment, there is no limitation on the value of "i" described above with reference to FIG. 19 is a schematic view showing a seventh embodiment of the invention. In this embodiment, as in the sixth embodiment, the output shaft 11 is in the form of a sleeve having a hole 11a through which the input shaft 2 extends. Further, the output gear 10 is fixed on the output shaft 11 and is in the form of an internal gear. The only point in which this embodiment differs from the sixth embodiment described above is that there are a plurality of planetary shafts 5 and a plurality of planetary gear units 6 and that the planetary shafts 5 are supported in a cantilever manner.

Figure 19:
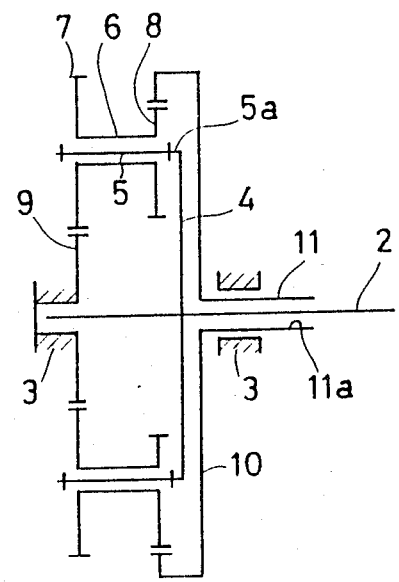
FIG. 19 is a schematic view showing a seventh embodiment of the invention.
Figure 20:
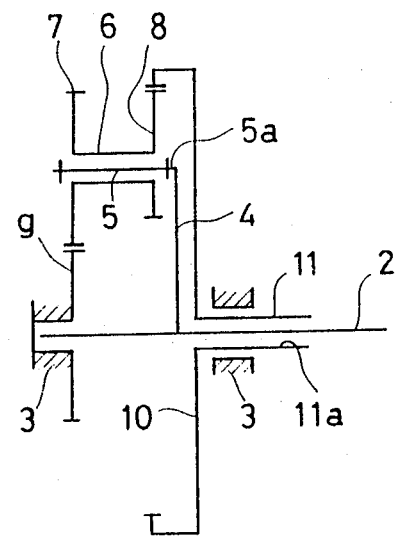
FIG. 20 is an eighth embodiment of the invention.

FIG. 20 is a schematic view showing an eighth embodiment of the invention. The point in which this embodiment differs from the embodiment shown in FIG. 19 is that there is only one planetary shaft 5 and only one planetary gear unit 6.

Three types of embodiments have been described with reference to FIGS. 1 through 20. However, various modifications and changes are possible. For example, while the fixed gear 9 has been described as being in the form of an external gear in all embodiments, it may be in the form of an internal gear. It is not absolutely necessary to arrange the planetary shaft 5 so that it extends parallel to the input shaft 2; it may be eccentrically arranged to intersect the input shaft 2. Further, in each embodiment, the carrier 4 and rotary body 12 have been in disk form for better rotational balance. However, they may be in arm form.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A planetary gear device, comprising a non-rotatable casing, an input shaft driven for rotation by a drive source, means rotatably supporting said input shaft inside and on said non-rotatable casing, a carrier fixed on said input shaft and extending radially from said input shaft, an output shaft rotatably supported in said non-rotatable casing, a plurality of planetary shafts connected at one of the respective ends thereof to said carrier and equispaced from each other on a circle concentric with the rotational axis of said input shaft, a plurality of planetary gear units each integrally comprising a main driving gear and a driven gear and each being rotatably supported on the respective planetary shaft of said plurality of planetary shafts, an output gear fixed on said output shaft and meshing with said driven gears, and a fixed gear fixed to said non-rotatable casing and meshing with said main driving gears, wherein at least either the combination of said main driving gears and said fixed gear or the combination of said driven gears and said output gear forms pairs of non-circular gears whose pitch curves are configured in rotational symmetries, wherein said plurality of planetary shafts corresponds in number to said rotational symmetries, and wherein said planetary shafts are arranged symmetrically with respect to said input shaft.

2. The planetary gear device of claim 1, further comprising a rotary body concentric with said input shaft and rotatably supported in said non-rotatable casing, at least one of said plurality of planetary shafts being eccentrically disposed with respect to said input shaft and connected at one end thereof to said carrier and at the other end thereof to said rotary body for support at both ends.

3. The planetary gear device of claim 2, wherein said rotary body is in the form of a disk.

4. The planetary gear device of claim 1, wherein said input shafts and output shafts project beyond the same lateral side of said non-rotatable casing, and either said input shaft or said output shaft is in the form of a sleeve through which the other shaft extends.

5. The planetary gear device of claim 1, wherein said carrier is in the form of a disk.

6. The planetary gear device of claim 1, wherein said output gear is an external gear.

7. The planetary gear device of claim 1, wherein said fixed gear is an external gear.

8. The planetary gear device of claim 1, wherein said output gear is an internal gear.

9. The planetary gear device of claim 1, wherein said non-rotatable casing comprises a cylindrical member and front and back cover members removably secured to said cylindrical member, said input shaft and said output shaft forming a power transmission mechanism disposed within, but not touching said cylindrical member and being rotatably supported by said front and back cover members, so that said power transmission mechanism is slidably removable as a single unit from said cylindrical member when either of said front or back cover members are removed from said cylindrical member

* * * * *